W. H. DAVIS.
ELECTROLYTIC CELL.
APPLICATION FILED DEC. 14, 1910.
1,015,546.
Patented Jan. 23, 1912.
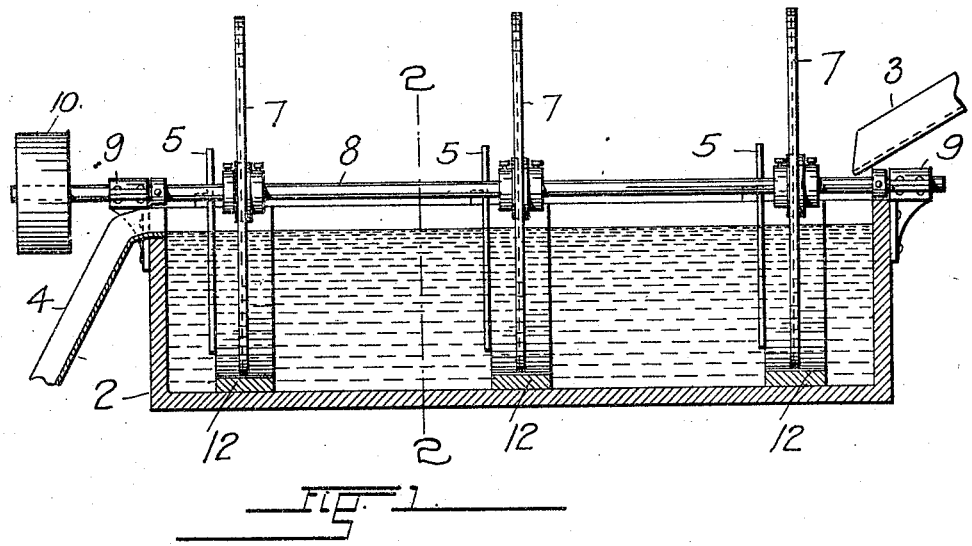
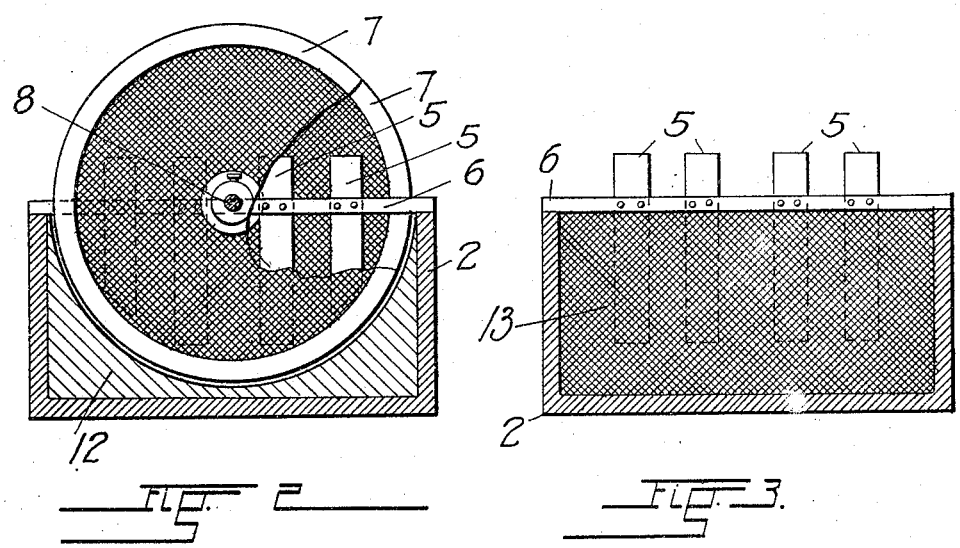

UNITED STATES PATENT OFFICE.

WILLIAM H. DAVIS, OF BOULDER, COLORADO, ASSIGNOR OF ONE-HALF TO GEORGE W. TEAL, OF BOULDER, COLORADO.

ELECTROLYTIC CELL.

1,015,546.      Specification of Letters Patent.      Patented Jan. 23, 1912.

Application filed December 14, 1910. Serial No. 597,238.

*To all whom it may concern:*

Be it known that I, WILLIAM H. DAVIS, a citizen of the United States of America, residing at Boulder, in the county of Boulder and State of Colorado, have invented certain new and useful Improvements in Electrolytic Cells, of which the following is a specification.

My invention relates to improvements in electrolytic cells of the type employed in the process of precipitating the metallic constituents of a chemical compound such as the gold bearing solution obtained in the treatment of auriferous ores by the cyanid or chlorination process. In the cells at present employed for this purpose, the electrodes at which the ions resulting from the electrolytic decomposition of the electrolyte, are evolved, are disposed substantially parallel to the flow of the latter and inasmuch as the direction in which the ions move toward the respective electrodes with which they must necessarily come in contact to be reduced to the metallic state, is determined by the resultant of a parallelogram of velocities, the components of which are the velocity of the flow of the electrolyte through the cell and the absolute velocity of the ionic migration, which is very slow, it follows that the time consumed in bringing all the cathions of the solution in intimate contact with the cathodes, or as the case may be the anions with the anodes, is considerable, and that the cell through which the electrolyte flows from one end to the other, must, in consequence, be made of great length.

It is the object of my invention to provide an electrolytic cell in which the flow of the electrolyte is an additive quantity to the ionic migration and in which the time required to effect a clean separation of the metallic constituents of the electrolyte from the containing solution by bringing the ions into intimate contact with the respective electrodes, the energy necessary for precipitation of the same, and the storage capacity of the cell, are in consequence, reduced to a considerable degree (about one tenth of that required in the method at present employed). I attain this object by the provision of permeable electrodes which are placed transversely to the flow of the electrolyte either in immediate contact with or in close proximity to the interior surface of the cell so that every particle of the electrolyte flowing from one end of the cell to the other, is compelled to pass through the foramina of the electrodes, and thus come either in direct contact with the metallic substance of the same, or in such close proximity thereto that the spaces to be traversed by the ions under the attractive influence of the electrode, are reduced to the minimum. The process may be expedited still further, by revolving the permeable electrodes at a suitable rate of speed, whereby their material substance is moved toward the ions passing through their interstices.

In the process of electrolytic deposition of gold or silver from a cyanid solution obtained in the treatment of auriferous or argentiferous ores, the cathodes are made of permeable material, while the anodes may be made solid and of any suitable form. It will be understood, however, that if the metal in solution is of a character to precipitate to the anodes (as lead, for example) the latter are made permeable and placed transversely to the flow of the electrolyte, for the precipitation of the electro-positive elements of the solution, while the cathodes may be solid and of any desired form, or, to obtain a better and more uniform distribution of the electric current, both the cathodes and the anodes may be made permeable and placed transversely to the flow of the electrolyte.

An embodiment of my invention is shown in the accompanying drawings in the various views of which like parts are similarly designated and in which—

Figure 1, represents a longitudinal section through a cell of my improved construction. Fig. 2, a transverse section taken along the line 2—2, Fig. 1, and Fig. 3, a similar section of a cell in which the permeable electrodes are stationary.

Referring to the drawings by numerals, 2 designates a tank of rectangular cross-section into one end of which the electrolyte is introduced by means of a launder 3, while it is discharged at the opposite end thereof by the use of an overflow and a therewith connected downwardly directed conduit 4.

The anodes, indicated by the numeral 5, are composed of a plurality of narrow plates which are suspended in series from beams 6 placed transversely upon the longitudinal edges of the tank.

The reference characters 7 designate the permeable electrodes, in this instance the cathodes, which being circular in form, are rigidly secured upon a shaft 8 which is rotatably supported in bearing-boxes 9, longitudinally with relation to the tank 2, and which carries a pulley 10 for the usual purpose. Fillers 12 placed within the tank below the respective permeable electrodes have their upper surfaces formed concentrically and in close proximity to the peripheral edges of the same, whereby the solution flowing through the tank is compelled to pass through the said electrodes and can not flow exteriorly of the same except through the narrow space between its circumferential edge and the respective filler, necessary to permit its rotary movement.

While the permeable electrodes may be composed of any suitable substance, I preferably employ in their construction, wire screen, which has been found to be well adapted to the purpose.

In the modified form shown in Fig. 3 of the drawings, the permeable electrodes 13 are stationary, being securely fastened along their edges, upon the interior surface of the tank with which they are in contact, and the fillers 12 are, for obvious reasons, omitted.

Having thus described my invention what I claim and desire to secure by Letters Patent is:—

1. In an electrolytic cell, a rotary, permeable, circular electrode, placed transversely to the flow of the electrolyte, and a filler occupying the space between the interior surface of the cell and the peripheral edge of the electrode.

2. In an electrolytic cell, a rotary shaft, and a plurality of permeable electrodes mounted thereon, transversely to the flow of the electrolyte.

3. In an electrolytic cell, a permeable electrode having a rotary movement in a plane transverse to the flow of the electrolyte.

4. In an electrolytic cell in which the electrolyte flows from one end to the other, an electrode having a movement in the electrolyte in a direction transverse to the flow thereof.

5. In an electrolytic cell, a circular permeable electrode having a rotary movement in a plane transverse to the flow of the electrolyte, the interior surface of the said cell, adjacent the said electrode conforming with the periphery thereof.

6. In an electrolytic cell, a permeable electrode conforming to the cross-sectional area thereof, below the fluid level, and having movement in a plane transverse to the flow of the electrolyte.

7. In an electrolytic cell, permeable electrodes placed transversely to the flow of the electrolyte, and electrodes in alternate arrangement with the permeable electrodes and each comprising a plurality of members spaced in a plane transverse to the flow of the electrolyte.

8. In an electrolytic cell, an electrode having a rotary movement in a plane transverse to the flow of the electrolyte.

9. In an electrolytic cell in which the electrolyte flows from one end to the other, a permeable electrode having a movement in the said electrolyte, transversely to its flow.

In testimony whereof I affix my signature in presence of two witnesses.

WILLIAM H. DAVIS.

Witnesses:
G. J. ROLLANDET,
E. M. KREMPEL.